(12) United States Patent
Walker et al.

(10) Patent No.: US 8,831,545 B2
(45) Date of Patent: Sep. 9, 2014

(54) METHODS AND APPARATUS FOR AGGREGATION OF GUIDE AND FREQUENCY MAP INFORMATION FOR MULTIPLE FREQUENCY NETWORKS USING UPPER-LEVEL SINGLE FREQUENCY NETWORK

(75) Inventors: Gordon Kent Walker, Poway, CA (US); An Mei Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 453 days.

(21) Appl. No.: 12/417,520

(22) Filed: Apr. 2, 2009

(65) Prior Publication Data

US 2009/0253415 A1    Oct. 8, 2009

Related U.S. Application Data

(60) Provisional application No. 61/042,704, filed on Apr. 4, 2008, provisional application No. 61/042,702, filed on Apr. 4, 2008.

(51) Int. Cl.
| | |
|---|---|
| *H04B 1/18* | (2006.01) |
| *H04N 5/445* | (2011.01) |
| *H04N 21/2362* | (2011.01) |
| *H04N 21/2665* | (2011.01) |
| *H04N 5/50* | (2006.01) |
| *H04N 21/414* | (2011.01) |
| *H04H 60/39* | (2008.01) |
| *H04H 60/72* | (2008.01) |
| *H04N 7/16* | (2011.01) |
| *H04H 60/51* | (2008.01) |
| *H04H 60/14* | (2008.01) |

(52) U.S. Cl.
CPC .......... *H04H 60/72* (2013.01); *H04N 5/44543* (2013.01); *H04H 60/51* (2013.01); *H04N 21/2362* (2013.01); *H04N 21/2665* (2013.01); *H04N 5/50* (2013.01); *H04N 21/41407* (2013.01); *H04H 60/39* (2013.01); *H04N 7/163* (2013.01); *H04H 60/14* (2013.01)
USPC ........ 455/161.1; 455/434; 455/446; 455/448; 455/450

(58) Field of Classification Search
USPC ......... 455/434, 446, 448, 450, 509, 515, 161, 455/1
See application file for complete search history.

(56) References Cited

U.S. PATENT DOCUMENTS

| | | | |
|---|---|---|---|
| 6,314,571 B1 | 11/2001 | Ogawa et al. | |
| 6,741,834 B1 | 5/2004 | Godwin | |
| 7,158,790 B1 * | 1/2007 | Elliott | 455/446 |
| 7,191,461 B1 | 3/2007 | Arsenault et al. | |
| 7,245,918 B2 * | 7/2007 | Nikkelen et al. | 455/443 |
| 7,277,708 B2 * | 10/2007 | Nakatsugawa et al. | 455/437 |
| 7,630,333 B2 * | 12/2009 | Bichot | 370/328 |
| 7,818,018 B2 * | 10/2010 | Nanda et al. | 455/509 |
| 2003/0135553 A1 | 7/2003 | Pendakur | |
| 2006/0072478 A1 * | 4/2006 | Fleischman | 370/254 |
| 2006/0075423 A1 | 4/2006 | Brique et al. | |
| 2008/0108365 A1 * | 5/2008 | Buddhikot et al. | 455/452.1 |

FOREIGN PATENT DOCUMENTS

| | | |
|---|---|---|
| CN | 1720733 A | 1/2006 |
| EP | 1032206 | 8/2000 |
| EP | 1032206 A2 * | 8/2000 |
| JP | 2000101525 A | 4/2000 |
| JP | 2003158730 | 5/2003 |
| WO | 2004077784 | 9/2004 |
| WO | 2007108598 | 9/2007 |

OTHER PUBLICATIONS

International Preliminary Report on Patentability, PCT/US2009/039490, International Preliminary Examining Authority, European Patent Office, Jul. 6, 2010.
International Search Report, PCT/US2009/039490, International Searching Authority, European Patent Office, Nov. 19, 2009.
Written Opinion, PCT/US2009/039490, International Searching Authority, European Patent Office, Nov. 19, 2009.

* cited by examiner

Primary Examiner — Lincoln Donovan
Assistant Examiner — Terry L Englund
(74) Attorney, Agent, or Firm — The Marbury Law Group, PLLC

(57) ABSTRACT

Implementations relate to methods and apparatus for the aggregation of guide and frequency map information for multiple frequency networks (MFNs) using an upper-level single frequency network (SFN). A mobile device can provide a program guide displaying a listing of content scheduled for broadcast by a content server. An upper network can be in hierarchical coverage with at least two networks, and can receive at least one of guide and frequency data associated with the program guide from the at least two networks. The upper network can aggregate the at least one of guide and frequency data into aggregated guide and frequency data. The aggregated data can be distributed to the at least two networks and/or accessed from the upper network. The mobile device can receive the aggregated data from either the at least two networks or the upper network.

122 Claims, 6 Drawing Sheets

METHODS AND APPARATUS FOR AGGREGATION OF GUIDE AND FREQUENCY MAP INFORMATION FOR MULTIPLE FREQUENCY NETWORKS USING UPPER-LEVEL SINGLE FREQUENCY NETWORK

CROSS-REFERENCE TO RELATED APPLICATIONS

This application is related and claims priority to U.S. Provisional Application No. 61/042,704, filed Apr. 4, 2008, assigned or under obligation of assignment to the assignee of the present application, entitled "Methods and Apparatus for Guide and Frequency Map Support of FSN to MFN" by Gordon Kent Walker and An Chen; and to U.S. Provisional Application No. 61/042,702, filed Apr. 4, 2008, assigned or under obligation of assignment to the assignee of the present application, entitled "Methods and Apparatus for Subscription Package Support Across Multiple Networks" by Gordon Kent Walker and An Chen, each of which provisional applications are incorporated herein by reference.

DESCRIPTION

1. Field

This invention generally relates to methods and apparatus for the aggregation of guide and frequency map information for multiple frequency networks (MFNs) using an upper-level single frequency network (SFN), and more particularly, to platforms and techniques for generating and distributing program and channel guides which aggregate the available media content from multiple sources for a wireless user in a geographic area.

2. Background

Multiple types of media distribution vendors, sources, and systems can exist and coexist within a given geographic region, market, or metropolitan area. Media content available to users in a given region can include video, audio, textual, location-based services, graphical, and/or other types of media content or services. In the case of wireless transmission links such as cellular telephone networks, the local media service providers can for example operate from single or multiple transmitters that provide coverage to all or a portion of a greater metropolitan area or other region. The wireless carriers and/or content providers may not be able to transmit from a single location, or may not each encompass the same geographic coverage area. As a result, potentially, each local multimedia provider can have a different service area or footprint within a greater metropolitan or other area. Each local provider can moreover operate on a separate frequency, and may not be able to coordinate its service guide offering with other providers.

A mobile receiving device, such as a cellular telephone or other network-enabled mobile device, can be configured to receive and display multiple guides on multiple frequencies. Because there is no central or aggregate source for radio frequency (RF) channel configuration or available service lineups, the mobile device may need to search for existing services as it moves about. The mobile device may move in and out of coverage with the individual providers during the course of the user's daily schedule. As a result, the mobile device may need to be in service discovery at all times to identify available channels and content. The situation can be exacerbated when the user travels from market to market, as all potential sources then need to be discovered. As a result, there can be 40 or more RF frequencies to search, even though about 25% or less of the frequencies may likely be occupied. Therefore, there may be unfavorable impact for battery life and other aspects of service such as guide accuracy with respect to content, and the availability of other services for mobile users.

SUMMARY

Implementations are directed to systems and methods for guide and frequency map support across multiple networks. According to implementations in one regard, a server or other network element can receive guide and frequency data for a first network, and guide and frequency data for a second network. In implementations, the coverage area for the first network and the second network can overlap in a given geographic area. In operation, the element can aggregate the guide and frequency data for the first network and the guide and frequency data for the second network into aggregated or combined guide and frequency data. Platforms and techniques according to various implementations of the present teachings can transmit the aggregated guide and frequency data to at least one of the first network and the second network. Various implementations further relate to providing a program guide displaying a listing of content scheduled for broadcast and receiving aggregated guide and frequency data associated with the program guide, wherein the aggregated guide and frequency data is aggregated from guide and frequency data received from the first network and a second network, allowing the user of a mobile device to view all available content and channels from multiple sources in a given geographic area and/or under a given subscription plan.

BRIEF DESCRIPTION OF THE DRAWINGS

The foregoing aspects of the implementations described herein will become more readily apparent by reference to the following detailed description when taken in conjunction with the accompanying drawings herein.

DETAILED DESCRIPTION

Mobile media services can be deployed and arranged in both wide-area Single Frequency Network (SFN) distribution (upper) networks, and more localized Multiple Frequency Network (MFN) distribution (local) networks. A media network using an organizing upper network can simplify service discovery and content selection for lower-level MFN local sources, thus eliminating the need to perform extensive frequency search and guide acquisition by virtue of the SFN network describing or providing underlying local MFN services and programming. For example, MediaFLO™ media services, as developed by Qualcomm Inc. and as, for instance, implemented using resources such as those described in U.S. Publication No. 2008/0039111, incorporated herein, can provide media content selection and delivery mechanisms. In one aspect in which the MediaFLO™ network is implemented, each local source and the SFN, or upper network, can be considered a "network" within the MediaFLO™ hierarchy.

Figure 1A:
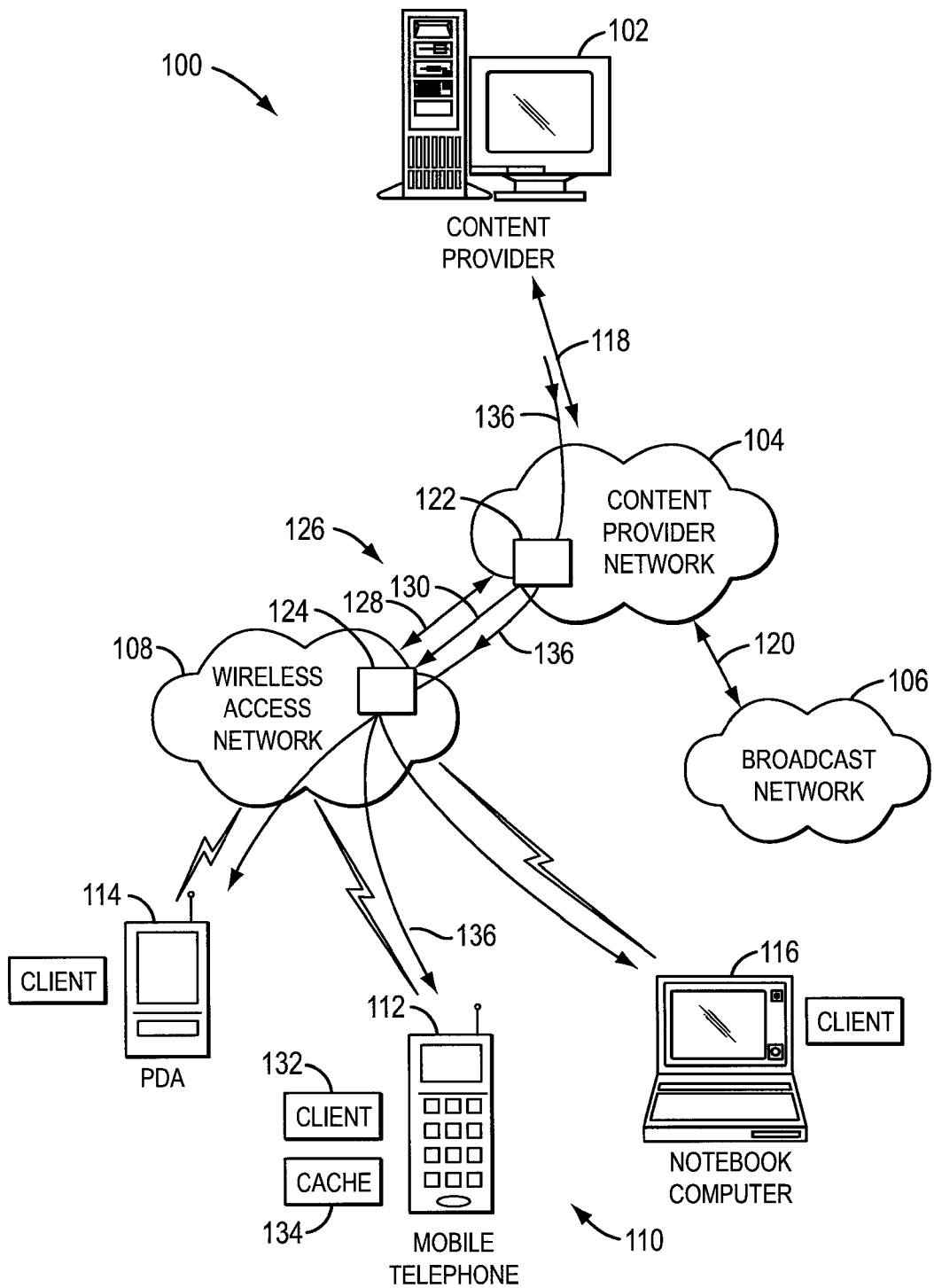
FIG. 1A illustrates a network that comprises an illustrative implementation of a content delivery system.

FIG. 1A illustrates an implementation of a communication network 100 that can comprise one implementation of a transport system that can operate to create and transport media content flows across data networks, consistent with implementations of the present teachings. For example, the transport system can be suitable for use in transporting content clips from a content provider network to a wireless access network for broadcast distribution. In implementations, the content can comprise video content, audio content, textual content, location-based content, and/or other media, content, or services.

The network 100 can comprise a content provider 102, a content provider network 104, a broadcast network 106, and a wireless access network 108. The network 100 can also include devices 110 that can comprise a mobile telephone 112, a personal digital assistance (PDA) 114, and a notebook computer 116. The devices 110 illustrate just some of the devices that are suitable for use according to various implementations of the transport system. It should be noted that although three devices are shown in FIG. 1A, virtually any number of devices or types of devices are suitable for use in the transport system.

The content provider 102 can operate to provide content for distribution to users in the network 100. The content can, again, comprise video, audio, multimedia content, clips, real-time and non real-time content, scripts, programs, text, data, or any other type of information or content. The content provider 102 can provide the content to the content provider network 104 for distribution. For example, the content provider 102 can communicate with the content provider network 104 via a communication link 118, which can comprise any type of wired, optical, wireless, and/or other communication link.

The content provider network 104 can comprise any combination of wired and wireless networks that operate to distribute content for delivery to users. The content provider network 104 can communicate with the broadcast network 106 via a link 120. The link 120 can comprise any suitable type of wired and/or wireless communication link. The broadcast network 106 can comprise any combination of wired, optical, wireless, and/or other networks that are configured to broadcast media content, including high-quality video and other content. For example, broadcast network 106 can be or include a specialized proprietary network that has been optimized to deliver high-quality content to selected devices over a plurality of optimized communication channels, or other types or combinations of networks.

According to various implementations, the transport system can operate to deliver content 136 from the content provider 102 for distribution to a content server 122 at the content provider network 104 that can operate to communicate with a broadcast base station (BBS) 124 at the wireless access network 108. The content server 122 and the BBS 124 can communicate using one or more implementations of a transport interface 126 that allows the content provider network 104 to deliver content 136 in the form of content flows to the wireless access network 108, for broadcast/multicast to the devices 110. The transport interface 126 can comprise a control interface 128 and a bearer channel 130. The control interface 128 can operate to allow the content server 122 to add, change, cancel, or otherwise modify contents flows from the content provider network 104 to the wireless access network 108. The bearer channel 130 can operate to transport the content flows from the content provider network 104 to the wireless access network 108.

In various implementations, the content server 122 can use the transport interface 126 to schedule a content flow to be transmitted to the BBS 124 for broadcast/multicast over the wireless access network 108. For example, the content flow can comprise a non real-time content clip provided by the content provider 102 for distribution using the content provider network 104. In various implementations, the content server 122 can be configured to negotiate with the BBS 124 to determine one or more parameters associated with the content 136 clip or other content. Once the BBS 124 receives the content clip, the BBS 124 can broadcast/multicast the content clip over the wireless access network 108 for reception by one or more of the devices 110. Any of the devices 110 can be authorized to receive the content clip and cache the content clip for later viewing by the device user.

For example, the device 110 can comprise a client program 132 that can be configured to provide a program guide that displays a listing of content that is scheduled for broadcast over the wireless access network 108. The device user can select to receive any particular content 136 for rendering in real-time or to store the content 136 in a cache 134 for later viewing. For example, the content clip can be scheduled for broadcast during the evening hours, and the device 112 can operate to receive the broadcast and cache the content clip in the cache 134 so that the device user can view the clip at a later time. The content 136 can be broadcast as part of a subscription service, and the receiving device may need to provide a key or otherwise authenticate itself to receive the broadcast on a subscription basis.

According to various implementations, the transport system can allow the content server 122 to receive program-guide records, program contents, and other related information from content provider 102. The content server 122 can update and/or create content for delivery to devices 110.

Figure 1B:
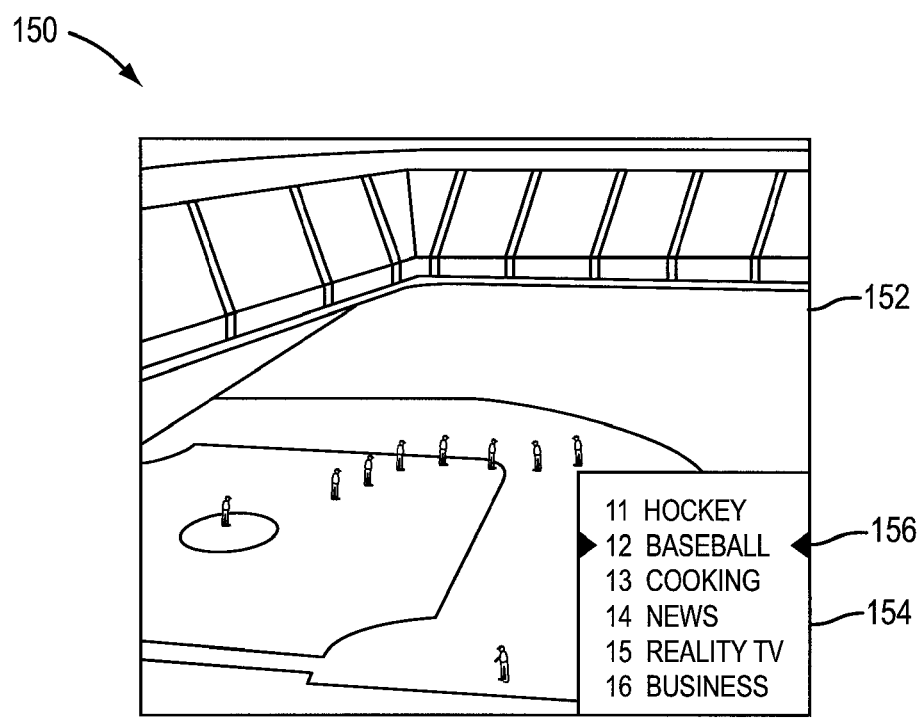
FIG. 1B illustrates an exemplary user interface generated by a mobile device.

Referring to FIG. 1B, an exemplary display screen 150 generated by the device 110 is depicted. In various implementations, the display screen 150 can comprise two regions 152 and 154. Region 152 can show the video for the currently selected multimedia program. Region 154 can show the program guide according to various implementations described herein. The program guide can list the programs being shown on various program channels. In implementations, the program guide can present those program channels available to a user in a current geographic service area. In general, the display screen 150 can include any number of regions for showing any type of content.

The device user can bring up the program guide at any time by clicking on an appropriate key (e.g., a "program menu" key) on the device 110. The device 110 can also automatically bring up the program guide if the user clicks on any one of a designated set of keys (e.g., a "scroll up" or "scroll down" button). In various implementations, the device 110 can monitor user navigation through the program guide to anticipate the next program selection.

For the implementation depicted in FIG. 1B, the program guide can display a listing of program channels and the programs currently being shown on these channels. A cursor 156 can indicate the program currently highlighted. Cursor 156 can move up and down the program guide in response to user key action. For example, if the device user moves the cursor past the top or the bottom of region 154, then another section of the program guide is retrieved and displayed in region 154. Other user interfaces and/or formats for the program guide can be used.

Figure 2:
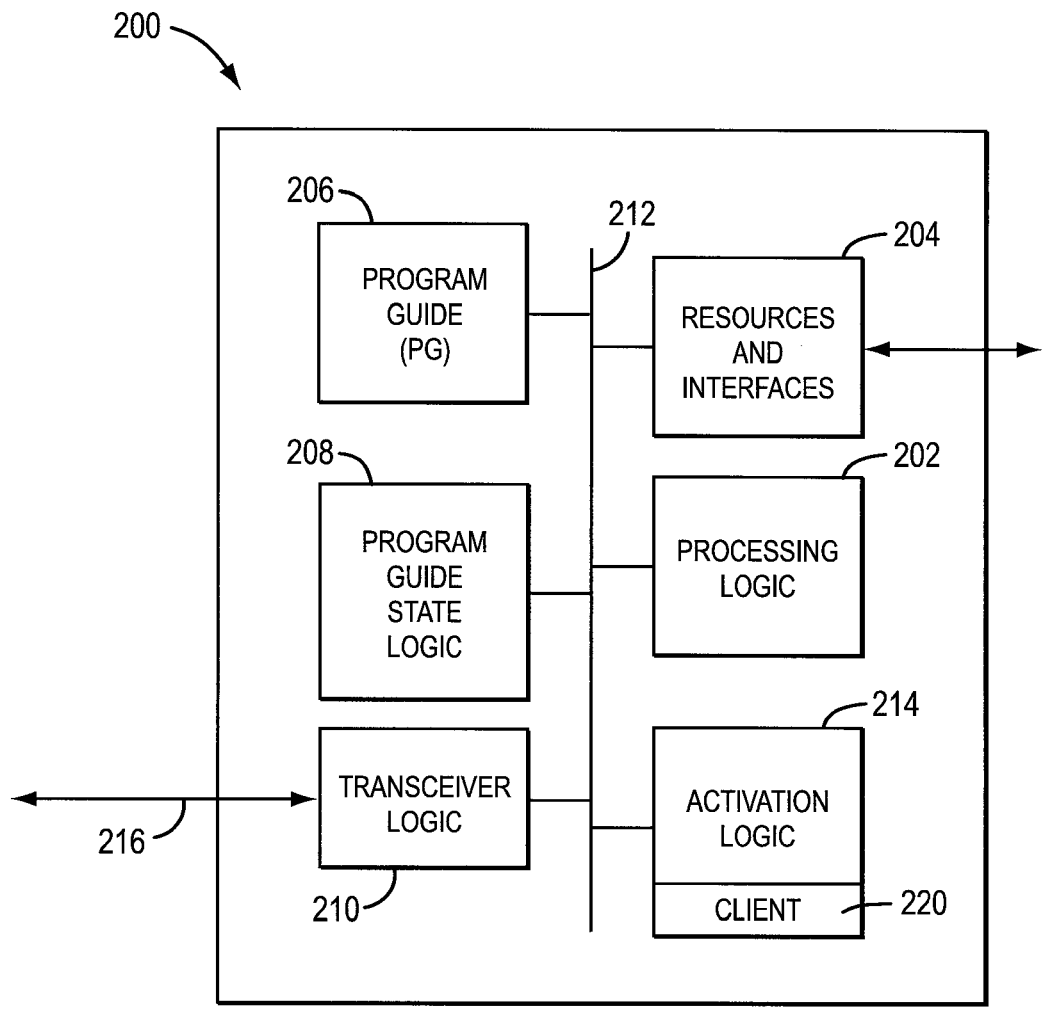
FIG. 2 illustrates an implementation of a content provider suitable for use in various implementations of the content delivery system.

FIG. 2 illustrates one implementation of a content provider server 200 suitable for use in various implementations of the content delivery system. For example, the server 200 can be used as the content provider 102 as depicted in FIG. 1A. The server 200 can comprise processing logic 202, resources and interfaces 204, and transceiver logic 210, all coupled to an internal data bus 212. The server 200 also can comprise activation logic 214, a program guide 206, and program guide state logic 208, which are also coupled to the data bus 212.

According to various implementations, the processing logic 202 can comprise a CPU, processor, gate array, hardware logic, memory elements, virtual machine, software, and/or any combination of hardware and software. Thus, the processing logic 202 can comprise logic to execute machine-readable instructions and control one or more other functional elements of the server 200 via the internal data bus 212.

The resources and interfaces 204 can comprise hardware and/or software elements that allow the server 200 to communicate with internal and external systems. For example, the internal systems can include mass storage systems, memory, a display driver, a modem, or other internal device resources. The external systems can include user interface devices, printers, disk drives, or other local devices or systems.

The transceiver logic 210 can comprise hardware, software, and/or other logic that can operate to allow the server 200 to transmit and receive data and/or other information with remote devices or systems using a communication channel 216. For example, in various implementations, the communication channel 216 can comprise any suitable type of communication link to allow the server 200 to communicate with a data network.

The activation logic 214 can comprise a CPU, processor, gate array, hardware logic, memory elements, virtual machine, software, and/or any combination of hardware, software, data, and/or other resources. The activation logic 214 can operate to activate a content server and/or a device to allow the content server and/or the device to select and receive content and/or services described in the program guide 206. In various implementations, the activation logic 214 can transmit a client program 220 to the content server and/or to the device during the activation process. The client program 220 can execute on the content server and/or on the device to receive the program guide 206 and display information about available content or services to the device user. Thus, the activation logic 214 can operate to authenticate a content server and/or a device, download the client program 220, and download the program guide 206 for rendering on the device by the client program 220.

The program guide 206 can comprise information in any suitable format that describes content and/or services that are available for devices to receive. For example, the program guide 206 can be stored in a local memory of the server 200, and can comprise information such as content or service identifiers, scheduling information, pricing, and/or any other type of relevant information. In various implementations, the program guide 206 can comprise one or more identifiable sections that can be updated by the processing logic 202 as changes are made to the available content or services, including, for instance, as a user travels from one service zone or area to another.

The program guide state logic 208 can comprise hardware and/or software that operate to generate notification messages that identify and/or describe changes to the program guide 206. For example, when the processing logic 202 updates the program guide 206, the program guide state logic 208 can be notified about the changes. The program guide state logic 208 can generate one or more notification messages that are transmitted to content servers which may have been activated with the server 200, so that the content servers can be promptly notified about the changes to the program guide 206.

In various implementations, as part of the content delivery notification message, a broadcast indicator can be provided to indicate when a section of the program guide identified in the message will be broadcast. For example, in various implementations, the broadcast indicator can comprise one bit or flag to indicate that the section will be broadcast, and a time indicator that indicates when the broadcast will occur. Thus, the content servers and/or the devices wishing to update their local copy of the program guide records can listen for the broadcast at the designated time, to receive the updated section of the program guide records.

In various implementations, the content delivery notification system can comprise program instructions stored on a computer-readable media or computer-readable storage media, which when executed by a processor, for example, the processing logic 202, can provide the functions of the server 200 described herein. For example, the program instructions can be loaded into the server 200 from a computer-readable media, such as a floppy disk, CDROM, memory card, FLASH memory device, RAM, ROM, or any other type of memory device or computer-readable media that can interface to the server 200 through the resources 204. In various implementations, the instructions can be downloaded into the server 200 from an external device or network resource that interfaces to the server 200 through the transceiver logic 210. The program instructions, when executed by the processing logic 202, can provide one or more implementations of a guide state notification system as described herein.

Figure 3:
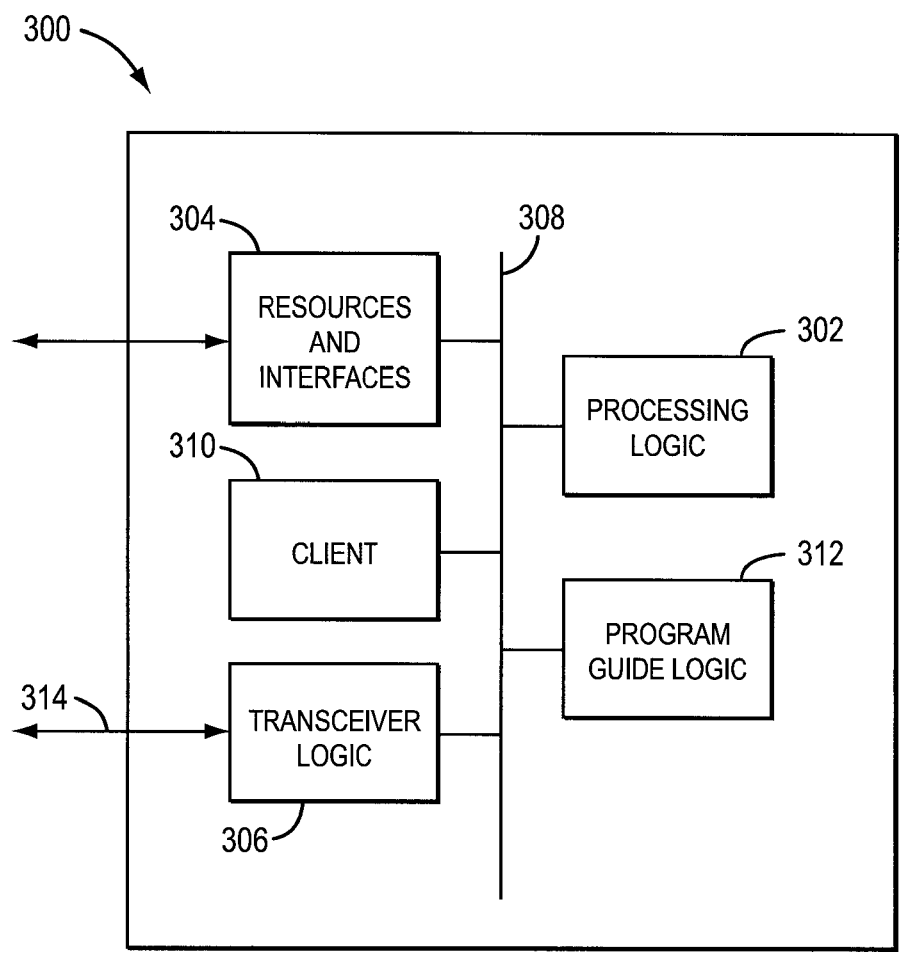
FIG. 3 illustrates an implementation of a content server suitable for use in various implementations of the content delivery system.

FIG. 3 illustrates one implementation of a content server 300 or other device capable for use in various implementations of a content delivery system. For example, content server 300 can be the content server 122 or the device 110 as depicted in FIG. 1A. The content server 300 can comprise processing logic 302, resources and interfaces 304, and transceiver logic 306, all coupled to a data bus 308. The content server 300 also can comprise a client 310 and a program guide logic 312, which can also be coupled to the data bus 308.

According to various implementations, the processing logic 302 can comprise a CPU, processor, gate array, hardware logic, memory elements, virtual machine, software, and/or any combination of hardware, software, logic, and/or other resources. Thus, the processing logic 302 can comprise logic configured to execute machine-readable instructions and control one or more other functional elements of the content server 300 via the internal data bus 308.

The resources and interfaces 304 can comprise internal or external hardware and/or software elements that can allow the content server 300 to communicate with internal and external systems. For example, the internal elements can include mass storage systems, memory, display drivers, network connections, modems, or other internal device resources. The external elements can include user interface devices, printers, disk drives, or other local devices or systems.

The transceiver logic 306 can comprise hardware and/or software that can operate to allow the content server 300 to transmit and receive data and/or other information with external devices or systems through a communication channel 314. For example the communication channel 314 can comprise a network communication link, a wireless communication link, or any other type of communication link.

During operation, the content server and/or the device 300 can be activated so that it can receive available content or services over a data network. For example, in various implementations, the content server and/or the device 300 can identify itself to a content provider server during an activation process. As part of the activation process, the content server and/or the device 300 can receive and/or store program guide records via the program guide logic 312. The program guide logic 312 can contain information that identifies content or services available for the content server 300 to receive. The client 310 can operate to render information in the program guide logic 312 on the content server and/or the device 300 using the resources and interfaces 304. For example, the client 310 can render information in the program guide logic 312 on a display screen or other user interface that is part of the device. The client 310 can also receive user input through the resources and interfaces so that a device user can select content or services.

In various implementations, the content server 300 can receive notification messages through the transceiver logic 306. For example, the messages can be broadcast, multicast, or unicast to the content server 300 and received by the transceiver logic 306. The program guide notification messages can identify updates to the program guide records at the program guide logic 312. In various implementations, the client 310 can process the program guide notification messages to determine whether the local copy at the program guide logic 312 needs to be updated. For example, in various implementations, the notification messages can include a section identifier, start time, end time, a total run time, and version number. The content server 300 can be configured to compare the information in the program guide notification messages to locally stored information at the existing program guide logic 312. If the content server 300 determines from the program guide notification messages that one or more sections of the local copy at the program guide logic 312 needs to be updated, the content server 300 can operate to receive the updated sections of the program guide in various ways. For example, the updated sections of the program guide can be broadcast at a time indicated in the program guide notification messages so that the transceiver logic 306 can receive the broadcasts and pass the updated sections to the content server 300, which can in turn update the local copy at the program guide logic 312.

In another implementation, the content server 300 can determine which sections of the program guide need to be updated, based on the received program guide update notification messages. The content server 300 can further transmit a request to a content provider server to obtain the desired updated sections of the program guide. For example, the request can be formatted using any suitable format and can comprise information such as a requesting content server identifier, section identifier, version number, and/or any other suitable information.

In various implementations, the content server 300 can perform one or more of the following functions according to various implementations of a program guide notification system. It should be noted that the following functions can be changed, rearranged, modified, added to, deleted, or otherwise adjusted within the scope of the implementations.

1. The content server 300 can be activated for operation with a content provider system to receive content or services. As part of the activation process, a client and program guide can be transmitted to the content server 300.

2. One or more program guide notification messages can be received by the content server 300 and used to determine if one or more sections of the locally stored program guide need to be updated.

3. In various implementations, if the content server 300 determines that one or more sections of the locally stored program guide need to be updated, the content server 300 can listen to a broadcast from the distribution system to obtain the updated sections of the program guide that the content server 300 needs to update its local copy.

4. In various implementations, the content server 300 can transmit one or more request messages to the content provider to obtain the updated sections of the program guide the content server 300 needs.

5. In response to the request, the content provider can transmit the updated sections of the program guide to the content server 300.

6. The content server 300 can use the received updated sections of the program guide to update its local copy of the program guide.

In various implementations, the content delivery system can comprise program instructions stored on a computer-readable media, which when executed by a processor, such as the processing logic 302, can provide the functions of the content delivery notification system as described herein. For example, instructions can be loaded into the content server 300 from a computer-readable media, such as a floppy disk, CDROM, memory card, FLASH memory device, RAM, ROM, or any other type of memory or storage device or computer-readable media that can interface to the content server 300 through the resources and interfaces 304. In various implementations, the instructions can be downloaded into the content server 300 from a network resource that can interface to the content server 300 through the transceiver logic 306. The instructions, when executed by the processing logic 302, can provide one or more implementations of a content delivery system as described herein.

It should be noted that the content server 300 as illustrated and described represents just one implementation, and that other implementations are possible within the scope of the implementations.

Figure 4:
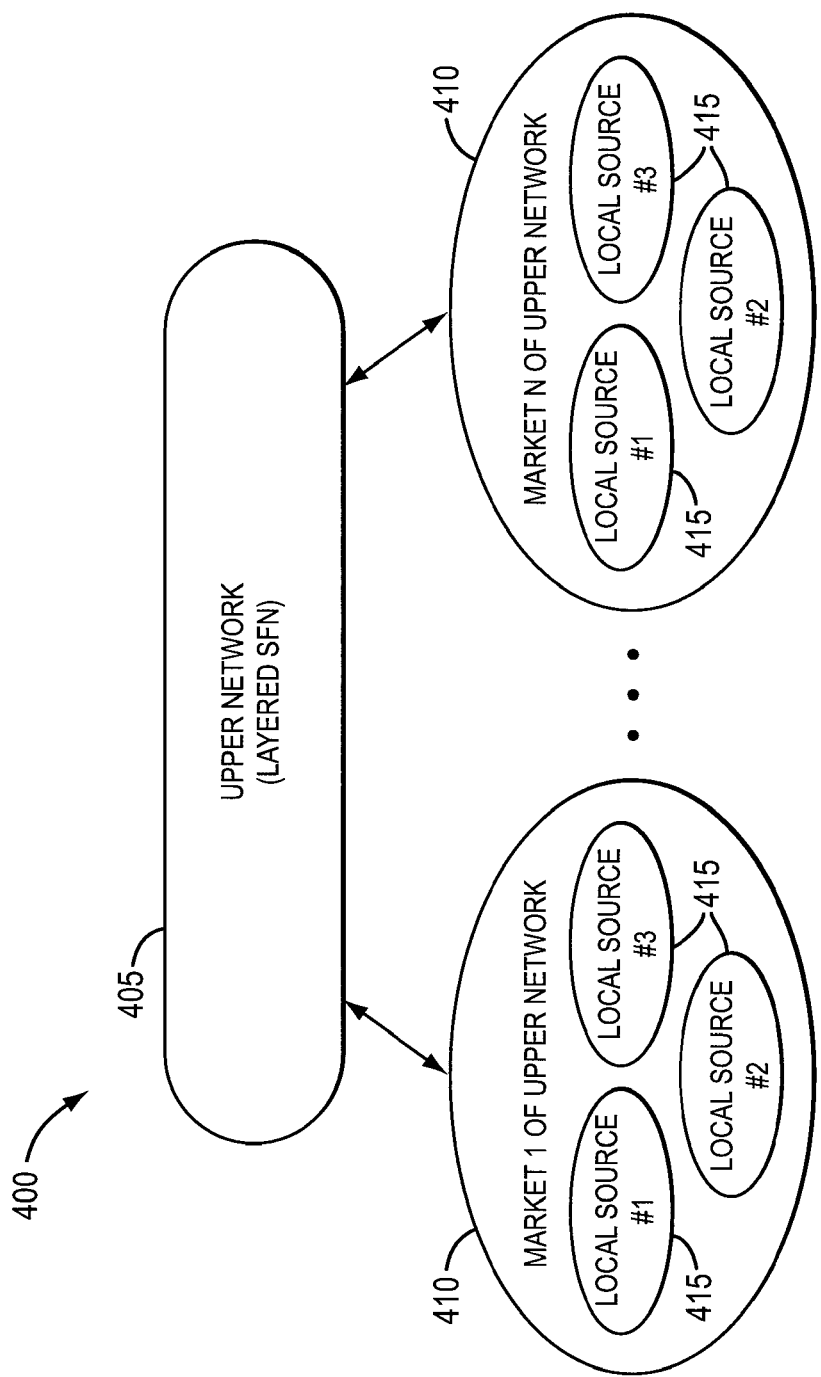
FIG. 4 illustrates an exemplary system for providing guide and frequency map support, according to various implementations.

FIG. 4 illustrates an exemplary system 400 for providing guide and frequency map support, according to various implementations. In various implementations, system 400 can include logic to provide and process data relating to a user subscription package and associated program access privileges. For example, a user can initiate and maintain an authorized subscription for service of one or more channels or types of content, and the system 400 can be configured to provide the content as a function of the user's subscription.

In one aspect, when an SFN network 405 such as Media-FLO™ coexists in a geographic region, market, or metropolitan area with multiple MFN media providers or local markets 410, the terminal design and user experience can be simplified and enhanced by distributing the RF/network parameters of MFN local sources 415 throughout the market 410. The system can further provide guide data for all of the participating MFN local sources 415. The system can in addition provide service packages and/or other subscription options for all of the participating MFN local sources 415. Media-FLO™ can be used to achieve such functionalities, as Media-FLO™ can support wide area and local SFN at the physical layer. In such an implementation, as used herein, each MFN local source 415 and the SFN can be considered to be "a network" in the MediaFLO™ hierarchy. It may be noted that while implementations are described in which the Media- FLO™ service is used to deliver wireless content, in implementations, other media platforms can be used.

The system 400 can further include a database to store data relating to the content delivery. For example, the database can store the program guide and frequency data that is to be delivered to the users. In implementations, database can in addition or instead store subscription information relating to a user subscription for one or more content packages. Before guide, frequency, and/or subscription data and related content are delivered to the user, the system 400 can perform an authentication of the subscription information to verify that a user is authorized to receive the content. In implementations, for example, system 400 can for instance access a subscription database to validate the user's subscription status and access privileges. In implementations, subscription data can be distributed and authenticated in the format of its native network. If, however, the subscription data is distributed by another network, the subscription data can be authenticated at the content server prior to distribution.

In implementations, a single-area system per RF frequency operated in an MFN manner on a market-by-market basis can also provide a similar service. A wide-area-only SFN service can support similar functions via filtering per market. In one example, a greater cost in terms of capacity may be incurred (e.g., where multiple local markets are supported in a shared wider area multiplex). As used herein, a "market" can be defined as a collection of transmitters in the upper network, which can be arranged in overlapping or separate coverage areas.

The individual local sources 415 can provide service metadata describing, for example, service location (e.g. RF frequency and service area) and/or configuration (e.g. physical layer type, mode of operation, network ID, etc.) to the infrastructure of the upper SFN network 405. In implementations, the data can include subscription and authentication information for the local sources 415 (e.g. an individual broadcaster's primary transmitter), and a combined package covering all of the participating local broadcasters. Further, the data can optionally include both the channel listings and physical addresses of the individual SFN services within the local sources 415. According to implementations in one regard, the greater the level of detail carried in the SFN network 405, the faster the acquisition of service can be for the local sources 415.

According to various implementations, the delivery of data can be split or distributed between the upper SFN network 405 and the local sources 415. For example, the local sources 415 can distribute respective individual program guide and frequency data, and the upper SFN network 405 can distribute a unified package of program guide and frequency data. The data can be distributed in a local portion of the SFN waveform, if the physical layer is capable of doing so. Otherwise, the data can be distributed with an ID that identifies the local area supported by the data. In MFN multimedia networks with a single layer, each market 410 can be independent, and no per-market labeling or identification may be required. In implementations, the upper SFN network 405 or the local sources 415 can distribute a pointer to the data. For example, the upper SFN network 405, the local sources 415 or another broadcast network can send a URL pointing to the data that is to be distributed by a unicast network or server.

According to various implementations, the SFN network 405 and local sources 415 need not share a single program guide format. However, the function of the mobile device can be simplified when a single program guide format is shared. If dissimilar guide formats are used, the common guide fields can be translated and/or mapped by the infrastructure to allow a common guide client in the terminal device. In one example, the supported feature set can be impacted by the program guide format of the source and distribution networks. For a MediaFLO™ system, information format features such as guide ordering can be utilized across multiple networks. Features such as program guide service order can be added to non-MediaFLO™ source networks within the upper network infrastructure. The update method of the local service guide can use the same mechanisms as the SFN network 405. Local services can be delivered as a single merged program guide and service definition table, or delivered on a per-network basis.

According to implementations in one regard, the upper layer distribution can in cases be out of synchrony with the individual sources. Under such circumstances, the device can default to the local source guide information and configuration upon discovery, which can require that the delivery mechanism be authenticated, and inhibit the local sources 415 from modifying or generating data for another network. The combined data can authenticate to the SFN network 405, or to the entire participating network. According to various implementations, the local service may need to store and/or generate only the current program title.

According to various implementations, a market 410 can be defined as a collection of transmitters in the SFN network 405. The current market can be determined using different methods. For example, the current upper network market can be defined by dominant local area operations infrastructure (LOI) for MediaFLO™ networks. Given that the per-market distribution of active local frequencies can significantly reduce the number of potentially active channels, a mobile device can potentially verify reception of defined channels in the background. This active list can be displayed when the program guide is requested. Furthermore, listed, but nominally unavailable RF channels can be checked in the background while the program guide is activated. The listed RF channels can be added to the program guide, if found active. In various implementations, the latitude and longitude coordinates of the local service areas can be provided by the SFN network 405. In various implementations, MediaFLO™ positioning can be used to determine interior locations within a building or other area or zone.

According to various implementations, the system 400 can provide RF carrier configuration for multiple other networks in a common general area, where coverage need not be continuous over the common general area. In one example, a hierarchical coverage area mechanism can be utilized in the SFN network physical layer. In another example, a MFN coverage area mechanism can be used in the SFN network 405. In yet another example, data filtering can be used in the mobile device for a SFN without hierarchical coverage areas in the physical layer.

The system 400 can further provide guide and frequency map support for local service providers by using a hierarchical coverage area mechanism in the SFN network physical layer, by utilizing an MFN coverage area mechanism in the SFN network 405, or by using data filtering in the mobile device for a SFN without hierarchical coverage areas in the physical layer.

According to various implementations, the system 400 can aggregate and translate program guides for local services. In one example, such functions can be achieved by execution on a per-market basis for a hierarchical upper SFN or upper MFN network. In another example, such functions can be achieved by a central execution per-market area for a non-layered SFN.

Additionally, the system 400 can identify local sources collectively or individually by network ID. For example, the system 400 can authenticate guide and frequency map support to an individual local source 415, or to multiple networks. The system 400 can further merge and display a unified program guide on a terminal utilizing ordered lists. In implementations, the system 400 can translate the guide data from the local sources, for instance into a common format. In implementations, translated guide data can be maintained in separate files or objects, or merged into one file or object, or merged into other numbers of files or objects. In one instance, ordered list methods compatible with a MediaFLO™ service guide can be used. Furthermore, the system 400 can provide a defined mechanism for handling conflicting data from the SFN network 405 and the local source 415 (e.g., the local source network is primary for its content and configuration, etc.). The system 400 can further operate to identify a currently valid local source 415 via the SFN network 405.

The system 400 can further provide support for MediaFLO™ system features such as guide ordering for non-MediaFLO™ networks, when possible, via the upper layer infrastructure (i.e., MediaFLO™ service guide features added to non-MediaFLO™ content). For example, the system 400 can provide a guide ordering and interactivity URL.

Furthermore, in implementations the system 400 can reduce mobile device power consumption by reducing the time devoted to local service discovery. The system 400 can further provide for description of market area via, for instance, an arbitrary latitude and longitude polygon or other shape or area. Additionally, the system 400 can determine the market using signal strength and/or synchronization and reception parameters. In another example, the system 400 can use latitude and longitude coordinates defining a market outline polygon(s) and/or other shapes or areas.

Moreover, the system 400 can describe coverage areas for individual sources or networks. In one example, the program guide can adapt by device location. In another example, the device can determine location via the Global Positioning System (GPS) or MediaFLO™ position location. In one example, the MediaFLO™ position location can work deep inside buildings. The device can log reception area for local sources to enhance guide accuracy and display speed.

The system 400 can further provide a terminal to determine available services such as candidates for possible market listing, optional location filter, rapid scan for active RF carriers via signal level, and/or refined scan using signal synchronization and service presence.

According to various implementations, each local source 415 can submit its program guide and RF parameter data to the SFN network 405. The SFN network 405 can aggregate the data from all local sources 415 and distribute the data back to all the local sources 415. In implementations, the guide data can be distributed separately, partially unified, or completely unified. In implementations, RF data can be distributed in its own native network format or can be distributed in a translated or unified format. Each local source 415 can mutually authenticate the transaction with SFN network 405. In one example, the device processing can be simplified as the device does not have to switch to the SFN network 405 to receive aggregated guide and RF parameter data if the device is currently monitoring the RF parameter data at the SFN network 405. In another example, the program guide and RF parameter data can be fully aggregated for all the local markets 410. As such, the device does not need to perform the integration itself. In another instance, program guide and RF parameter can be available in all local sources 415, thus substantially reducing the need to wait for acquiring data when the device is roaming from network to network.

In implementations, the SFN network 405 can host or contain wide area and local area guide data, and each local source 415 can host or contain local area guide data associated with the networks of the respective local sources 415. The local area guide data of the SFN network 405 can be aggregated with the local area guide data of the local sources 415 to form aggregated local area guide data, for instance in a format consistent with the SFN network 405. In implementations, the SFN network 405 can distribute its wide area and local area guide data directly over an air interface to a mobile device. In implementations, each local source 415 can distribute its local area guide data over an air interface to the mobile device. In implementations, part or all of the local or wide area guide data from the SFN network 405 and/or the local sources 415 can be aggregated at the mobile device. In implementations, part of all the local or wide area guide data from the SFN network 405 and/or the local sources 415 can be aggregated at the respective SFN network 405 or local sources 415.

In one example, a backend interface may need to be configured to distribute program guide and RF parameter data to the SFN network 405. In still another example, the latency can be increased if there is a dynamic update to the program guide and RF parameter data, as data from local sources 415 needs to be distributed to the SFN network 405, and from the SFN network 405 back to the local sources 415 (e.g., round trip delay). In one example, over the air (OTA) bandwidth for sending aggregated guide and RF parameter data in all local sources 415 can be increased. In still another example, the complexity and robustness of the SFN network 405 headend can be increased.

In various implementations, as noted each local source 415 can submit guide data to the SFN network 405 and the SFN network 405 can aggregate the data from all local sources 415 and broadcast the aggregated guide data and RF parameters on its network. In another example, the device can receive data while it is roaming across all different local sources 415. In such a scenario, the device can receive data from the SFN network 405 while it roams across all different local sources 415.

In another example, the OTA bandwidth for local sources 415 can be reduced. The local sources 415 do not have to store and/or generate their own program guide and RF parameter data because the device can access the program guide and RF parameter data from the SFN network 405. In another example, a backend interface may need to be configured to distribute program guide and RF parameter data to the SFN network 405. In another example, the latency can be increased if there is a dynamic update to the program guide and RF parameter data, as data needs to be distributed from the local sources 415 to the SFN network 405. In another instance, OTA bandwidth for sending aggregated guide and RF parameter data for the SFN network 405 can be increased. In still another example, the complexity and robustness of the SFN network 405 headend can be increased.

If the OTA bandwidth or the complexity and robustness of the SFN network 405 headend are increased, the device may be able to obtain more program guide and RF parameter data for markets to which the device may or may not roam. Additional functionalities can be put on the device to present the relevant program guide and RF parameter data to a user, depending on where the user is located. The rest of the data can be saved and filtered for when the user roams at a later time.

In still another aspect, aggregated guide and RF parameter data for local sources 415 can belong within the same market (i.e., in an MFN case for the local source without having the SFN network). In one example, the back and forth data exchange between local sources 415 and the SFN network 405 can be decreased. In another example, program guide data can be aggregated, thus simplifying the device processing as mentioned previously. In yet another example, OTA bandwidth for sending aggregated data for all local sources 415 can be increased. In another example, an interface may need to be built to have all local sources 415 exchange data with all other local sources 415 within that local market 410. In still another example, the local source operators may not agree to share program guide data in a marketplace with each other.

In still another aspect, each local source 415 can store and/or generate its own program guide and RF parameter data. In one instance, OTA bandwidth can be reduced because the local sources 415 do not have to store and/or generate aggregated data (i.e., "duplicate" data). In another example, headend operation can be simplified, latency in exchanging program guide and RF parameter data can be reduced, and quicker updates of program guide and RF parameter data can be allowed. In yet another example, complexity and robustness on the device can be increased as a result of having access to aggregated data. In another example, the device may be configured to switch back and forth between different frequencies to check if the program guide data for the other frequencies has been updated (e.g., when the device has only one receiver chain). In still another example, the device can be configured with logic to determine what RF to scan for, and/or the order in which to scan, such as ascending or descending frequency order.

In yet another aspect, the system 400 can be deployed with some fraction of the program guide and RF parameter data duplicated in the SFN network 405 and the local sources 415. For example, the SFN network 405 can store and/or generate the RF parameter data for the available local sources 415. Further, the SFN network 405 can optionally store and/or generate the aggregated guide data. The local sources 415 can store and/or generate program guide data in a format functionally compatible with the SFN network 405. In one example, a device that is unaware of the SFN network 405 can still function, as can a device out of coverage with the SFN network 405. Furthermore, devices affiliated with the SFN network 405 may generally function or perform better. In another example, program guide data can be carried redundantly if the SFN network 405 is distributing consolidated guide data. In one example, in the case where conflicts may arise between versions of data, the conflicts can be managed via a use of criteria including relative freshness and identify of source (e.g., newer data from an original source is accepted).

Figure 5:
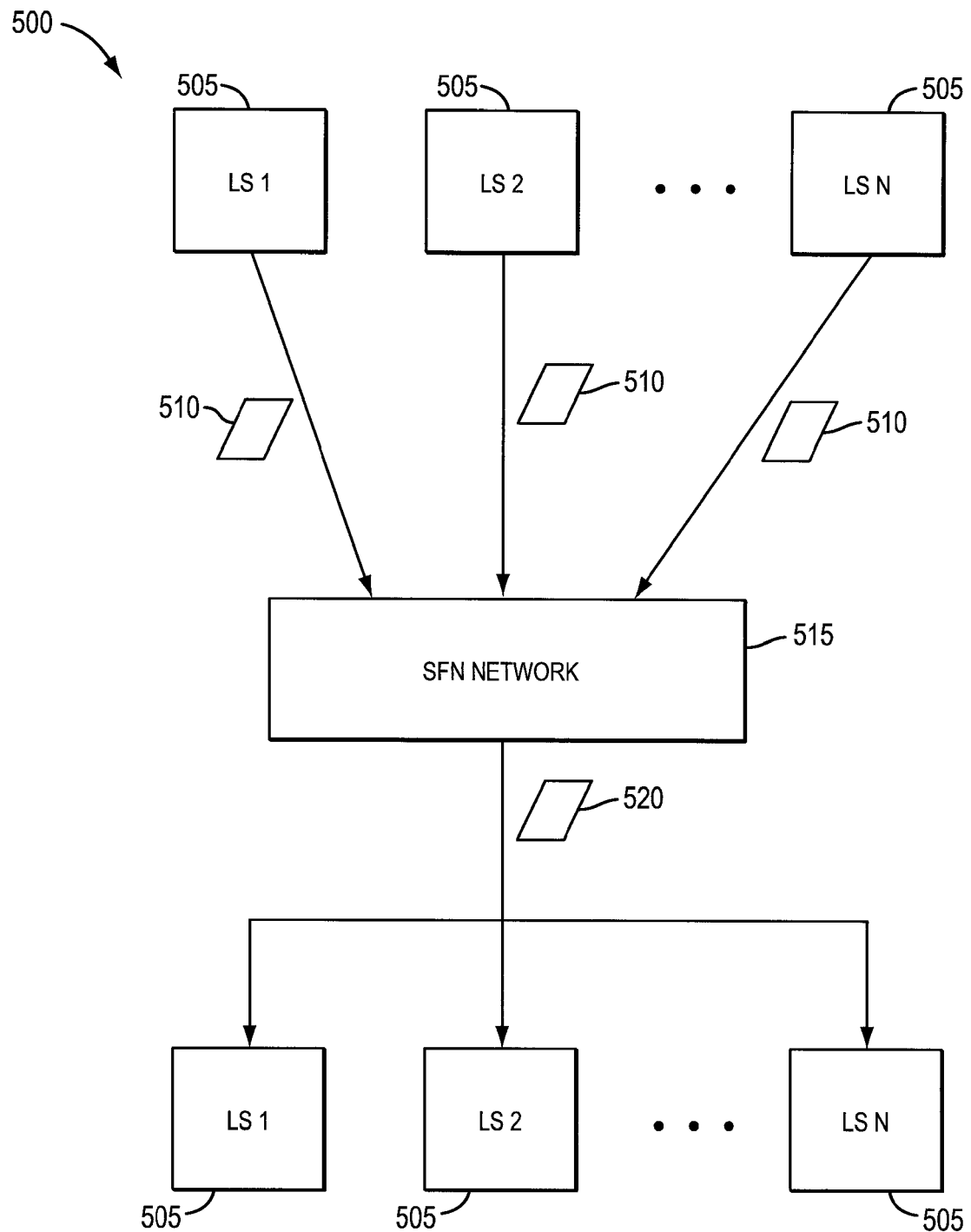
FIG. 5 illustrates an exemplary system for integrating guide and frequency data, according to various implementations.

FIG. 5 illustrates an exemplary system 500 for integrating guide and frequency data. The system 500 can include a plurality of local sources 505 and a SFN network 515. The plurality of local sources 505 can each submit respective program guide and RF parameter data 510 to the SFN network 515. The program guide and RF parameter data 510 can vary depending on the corresponding local source of the plurality of local sources 505 from which the data 510 is sent.

The SFN network 515 can receive the respective program guide and RF parameter data 510 from the plurality of local sources 505. Further, the SFN network 515 can aggregate the respective program guide and RF parameter data 510 into aggregated guide and RF parameter data 520. The SFN network 515 can distribute the aggregated guide and RF parameter data 520 to each of the plurality of local sources 505. In various implementations, each of the plurality of local sources 505 can mutually authenticate the transmission of the aggregated guide and RF parameter data 520 with the SFN network 515.

The various illustrative logics, logical blocks, modules, and circuits described in connection with the implementations disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

According to various exemplary implementations, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of computer-readable media.

The processing of a method or algorithm described in connection with the implementations disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium is coupled to the processor, such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

What is claimed is:

1. A method for guide and frequency map support across multiple networks, the method comprising:
   receiving a first guide data and a first frequency data for a first network, wherein the first network transmits a first content identified in the first guide data over a first frequency to a first plurality of devices;
   receiving a second guide data and a second frequency data for a second network, wherein the second network transmits a second content identified in the second guide data over the second frequency to a second plurality of devices;
   generating aggregated guide and frequency data that includes the first guide data and the first frequency data for the first network, and the second guide data and the second frequency data for the second network; and
   transmitting the aggregated guide and frequency data to the first plurality of devices and the second plurality of devices over a third frequency that is different than the first frequency and the second frequency, wherein the aggregated guide and frequency data is transmitted separately from the first content and the second content.

2. The method of claim 1, wherein the first network and the second network mutually authenticate a transmission of the aggregated guide and frequency data.

3. The method of claim 1, wherein the first guide data and the first frequency data for the first network and the second guide data and the second frequency data for the second network are received at an upper network in hierarchical coverage with the first network and the second network such that the upper network can transmit the aggregated guide and frequency data to the first plurality of devices of the first network and the second plurality of devices of the second network.

4. The method of claim 1, further comprising:
   authenticating user subscription information over the third frequency for the first network and the second network to determine available services on the first network and the second network.

5. The method of claim 4, further comprising:
   aggregating the user subscription information from the first network and the second network for distribution via an upper network.

6. The method of claim 3, further comprising:
   receiving a first service area data and a first physical layer configuration data corresponding to the first network, wherein the first network broadcasts the first content to the first plurality of users within the first service area, and a physical layer of the first network is configured in accordance with the first physical configuration layer data; and
   receiving a second service area data and a second physical layer configuration data corresponding to the second network, wherein the second network transmits the second content to the second plurality of users within the second service area, and a second physical layer of the second network is configured in accordance with the second physical layer configuration data.

7. The method of claim 6, wherein the aggregated guide and frequency data further comprises the first service area data, the first physical layer configuration data, the second service area data, and the second physical layer configuration data.

8. The method of claim 6, wherein a third service area of the upper network includes the first service area of the first network and the second service area of the second network, the first service area of the first network being exclusive of the second service area of the second network.

9. The method of claim 1, wherein the generating the aggregated guide and frequency data comprises at least one of translating or merging the first guide data for the first network and the second guide data for the second network.

10. The method of claim 1, further comprising:
    transmitting a pointer to the aggregated guide and frequency data via a broadcast network.

11. The method of claim 10, further comprising:
    retrieving the aggregated guide and frequency data via a unicast network.

12. The method of claim 3, wherein the first network and the second network store guide data in a format compatible with the upper network.

13. The method of claim 1, wherein the aggregated guide and frequency data is based on user subscription information.

14. A system for guide and frequency map support across multiple networks, comprising:
    a server being configured to:
      receive a first guide and frequency data for a first network and a second guide and frequency data for a second network, wherein the first network operates on a first frequency identified in the first guide and frequency data and the second network operates on a second frequency identified in the second guide and frequency data;
      generate aggregated guide and frequency data that includes at least a portion of the first guide and frequency data for the first network and at least a portion of the second guide and frequency data for the second network; and
      transmit the aggregated guide and frequency data over a third frequency that is different from the first frequency and the second frequency.

15. The system of claim 14, wherein the first network and the second network mutually authenticate a transmission of the aggregated guide and frequency data.

16. The system of claim 14, wherein the first guide and frequency data for the first network and the second guide and frequency data for the second network are received at an upper network in hierarchical coverage with the first network and the second network such that a service area of the upper network includes service areas of the first and second networks.

17. The system of claim 12, wherein the first network and the second network store guide data in a format compatible with the upper network.

18. The system of claim 14, wherein the server is further configured to transmit the aggregated guide and frequency data to a mobile device separately from content.

19. The system of claim 18, wherein the aggregated guide and frequency data based on to a location of the mobile device.

20. The system of claim 18, wherein the server is further configured to authenticate user subscription information to determine available services.

21. The system of claim 14, wherein the first guide data for the first network and the second guide data for the second network are translated or merged to generate the aggregated guide and frequency data.

22. The system of claim 14, wherein the server is further configured to transmit a pointer to the aggregated guide and frequency data via a broadcast network.

23. The system of claim 22, wherein the server is further configured to retrieve the aggregated guide and frequency data via a unicast network.

24. The system of claim 14, wherein the aggregated guide and frequency data is based on user subscription information.

25. The system of claim 24, wherein the server is further configured to aggregate the user subscription information from the first network and the second network for distribution via an upper network.

26. The system of claim 16, wherein the server is further configured to:
receive a first service area data and a first physical layer configuration data corresponding to the first network, wherein the first network broadcasts a first content to a first plurality of users within a first service area, and a physical layer of the first network is configured in accordance with the first physical layer configuration data; and
receive a second service area data and a second physical layer configuration data corresponding to the second network, wherein the second network transmits a second content to a second plurality of users within a second service area, and a second physical layer of the second network is configured in accordance with the second physical layer configuration data.

27. The system of claim 26, wherein the aggregated guide and frequency data further comprises the first service area data, the first physical layer configuration data, the second service area data, and the second physical layer configuration data.

28. The system of claim 26, wherein a third service area of the upper network includes the first service area of the first network and the second service area of the second network, the first service area of the first network being exclusive of the second service area of the second network.

29. A system for guide and frequency map support across multiple networks, comprising:
a server comprising:
means for receiving at least one of guide and frequency data for a first network that transmits a first content and at least one of guide and frequency data for a second network that transmits a second content;
means for generating aggregated guide and frequency data that includes at least a portion of the at least one of guide and frequency data for the first network and at least a portion of the at least one of guide and frequency data for the second network; and
means for transmitting the aggregated guide and frequency data separate from the first content and the second content.

30. The system of claim 29, wherein the first network and the second network mutually authenticate a transmission of the aggregated guide and frequency data.

31. The system of claim 29, wherein the at least one of guide and frequency data for the first network and the second network is received at an upper network in hierarchical coverage with the first network and the second network.

32. The system of claim 31, wherein the first network and the second network store guide data in a format compatible with the upper network.

33. The system of claim 29, wherein the aggregated guide and frequency data is based on a location of the mobile device.

34. The system of claim 29, wherein the means for serving is further configured to authenticate user subscription information to determine available services.

35. The system of claim 29, wherein means for generating aggregated guide and frequency data comprises at least one of means for translating the guide data for the first network and the guide data for the second network and means for merging the guide data for the first network and the guide data for the second network.

36. The system of claim 29, wherein the server further comprises means for transmitting a pointer to the aggregated guide and frequency data via a broadcast network.

37. The system of claim 36, wherein the server further comprises means for retrieving the aggregated guide and frequency data via a unicast network.

38. The system of claim 26, wherein the aggregated guide and frequency data is based on user subscription information.

39. The system of claim 38, further comprising:
means for aggregating the user subscription information from the first network and the second network for distribution via an upper network.

40. The system of claim 31, further comprising:
means for receiving a first service area data and a first physical layer configuration data corresponding to the first network, wherein the first network broadcasts the first content to a first plurality of users within the first service area, and a physical layer of the first network is configured in accordance with the first physical layer configuration data; and
means for receiving a second service area data and a second physical layer configuration data corresponding to the second network, wherein the second network transmits the second content to a second plurality of users within the second service area, and a second physical layer of the second network is configured in accordance with the second physical layer configuration data.

41. The system of claim 40, wherein the aggregated guide and frequency data further comprises the first service area data, the first physical layer configuration data, the second service area data, and the second physical layer configuration data.

42. The system of claim 40, wherein a third service area of the upper network includes the first service area of the first network and the second service area of the second network, the first service area of the first network being exclusive of the second service area of the second network.

43. A computer program product, comprising:
a computer-readable medium comprising:
at least one instruction for causing a computer to receive guide and frequency data for a first network and guide and frequency data for a second network; and
at least one instruction for causing the computer to generate aggregated guide and frequency data that includes the guide and frequency data for the first network and the guide and frequency data for the second network.

44. The computer program product of claim 43, wherein the first network and the second network mutually authenticate a transmission of the aggregated guide and frequency data.

45. The computer program product of claim 43, wherein the guide and frequency data for the first network and the second network is received at an upper network in hierarchical coverage with the first network and the second network.

46. The computer program product of claim 45, wherein the first network and the second network store guide data in a format compatible with the upper network.

47. The computer program product of claim 43, wherein the computer-readable medium further comprises at least one instruction for causing a computer to transmit the aggregated guide and frequency data to a mobile device.

48. The computer program product of claim 47, wherein the aggregated guide and frequency data is based on a location of the mobile device.

49. The computer program product of claim 43, wherein the computer-readable medium further comprises at least one instruction for causing a computer to authenticate user subscription information for the first network and the second network to determine available services on the first network and the second network.

50. The computer program product of claim 43, wherein the at least one instruction for causing the computer to generate aggregated guide and frequency data comprises at least one of instructions for causing the computer to translate the guide data for the first network and the guide data for the second network and instructions for causing the computer to merge the guide data for the first network and the guide data for the second network.

51. The computer program product of claim 43, wherein the computer-readable medium further comprises at least one instruction for causing a computer to transmit a pointer to the aggregated guide and frequency data via a broadcast network.

52. The computer program product of claim 51, wherein the computer-readable medium further comprises at least one instruction for causing a computer to retrieve the aggregated guide and frequency data via a unicast network.

53. The computer program product of claim 43, wherein the aggregated guide and frequency data is based on user subscription information.

54. The computer program product of claim 53, wherein the computer-readable medium further comprises at least one instruction for causing the computer to aggregate the user subscription information from the first network and the second network for distribution via an upper network.

55. The computer program product of claim 31, wherein the computer-readable medium further comprises at least one instruction for causing the computer to transmit the aggregated guide and frequency data to a mobile device separately from content.

56. The computer program product of claim 45, wherein the computer-readable medium further comprises:
at least one instruction for causing the computer to receive a first service area data and a first physical layer configuration data corresponding to the first network, wherein the first network broadcasts a first content to a first plurality of users within a first service area, and a physical layer of the first network is configured in accordance with the first physical layer configuration data; and
at least one instruction for causing the computer to receive a second service area data and a second physical layer configuration data corresponding to the second network, wherein the second network transmits a second content to a second plurality of users within a second service area, and a second physical layer of the second network is configured in accordance with the second physical layer configuration data.

57. The computer program product of claim 56, wherein the aggregated guide and frequency data further comprises the first service area data, the first physical layer configuration data, the second service area data, and the second physical layer configuration data.

58. The computer program product of claim 56, wherein a third service area of the upper network includes the first service area of the first network and the second service area of the second network, the first service area of the first network being exclusive of the second service area of the second network.

59. A method for guide and frequency map support on a mobile device, comprising:
providing a program guide displaying a listing of content scheduled for broadcast; and
receiving aggregated guide and frequency data associated with the program guide separate from the content, wherein the aggregated guide and frequency data includes at least one of guide and frequency data received from a first network and at least one of guide and frequency data received from a second network.

60. The method of claim 59, further comprising:
entering into a service connection with at least one of the first network and the second network.

61. The method of claim 59, wherein the aggregated guide and frequency data is received from at least one of the first network and the second network.

62. The method of claim 59, wherein the aggregated guide and frequency data is received from an upper network in hierarchical coverage with the first network and the second network.

63. The method of claim 59, wherein the first network and the second network mutually authenticate the aggregated guide and frequency data.

64. The method of claim 59, wherein the aggregated guide and frequency data is based on a location of the mobile device.

65. The method of claim 59, wherein the aggregated guide and frequency data is based on user subscription information.

66. The method of claim 59, wherein the guide data for the first network and the guide data for the second network is at least one of translated or merged to form the aggregated guide data.

67. The method of claim 59, further comprising:
receiving a pointer to the aggregated guide and frequency data via a broadcast network.

68. The method of claim 67, further comprising:
retrieving the aggregated guide and frequency data via a unicast network.

69. The method of claim 62, wherein the first network and the second network store guide data in a format compatible with the upper network.

70. The method of claim 59, wherein the aggregated guide and frequency data originates at a content server.

71. A mobile device, comprising:
a wireless interface; and
a processor, communicating with the wireless interface, the processor being configured to:
provide a program guide displaying a listing of content scheduled for broadcast; and
receive aggregated guide and frequency data associated with the program guide, wherein the aggregated guide and frequency data includes guide and frequency data received from a first network and guide and frequency data received from a second network.

72. The mobile device of claim 71, wherein the processor is further configured to enter into a service connection with at least one of the first network and the second network.

73. The mobile device of claim 71, wherein the aggregated guide and frequency data is received from at least one of the first network and the second network.

74. The mobile device of claim 71, wherein the aggregated guide and frequency data is received from an upper network in hierarchical coverage with the first network and the second network.

75. The mobile device of claim 71, wherein the first network and the second network mutually authenticate the aggregated guide and frequency data.

76. The mobile device of claim 71, wherein the aggregated guide and frequency data is based on a location of the mobile device.

77. The mobile device of claim 71, wherein the aggregated guide and frequency data originates at a content server.

78. The mobile device of claim 71, wherein the aggregated guide and frequency data is based on user subscription information.

79. The mobile device of claim 71, wherein the guide data for the first network and the guide data for the second network are at least translated or merged to form the aggregated guide data.

80. The mobile device of claim 71, wherein the processor is further configured to receive a pointer to the aggregated guide and frequency data via a broadcast network.

81. The mobile device of claim 80, wherein the processor is further configured to retrieve the aggregated guide and frequency data via a unicast network.

82. The mobile device of claim 71, wherein the processor is further configured to receive the aggregated guide and frequency data separately from the content.

83. A system for guide and frequency map support on a mobile device across multiple networks, comprising:
    means for providing a wireless interface; and
    means for processing content from a first network and a second network, and communicating with the means for providing the wireless interface, the means for processing comprising:
        means for providing a program guide displaying a listing of content scheduled for broadcast;
        means for receiving aggregated guide and frequency data associated with the program guide and over a third network, wherein the aggregated guide and frequency data includes at least one of guide and frequency data received from the first network and at least one of guide and frequency data received from the second network; and
        means for authenticating over the third network to access the content from the first network and the second network.

84. The system of claim 83, wherein the means for processing further comprises means for entering into a service connection with at least one of the first network over a first frequency and the second network over a second frequency that is different than the first frequency.

85. The system of claim 83, wherein the aggregated guide and frequency data is received from at least one of the first network and the second network.

86. The system of claim 83, wherein the third network comprises an upper network in hierarchical coverage with the first network and the second network such that a service area of the third network includes service areas of the first and second networks.

87. The system of claim 83, wherein the first network and the second network mutually authenticate the aggregated guide and frequency data.

88. The system of claim 83, wherein the aggregated guide and frequency data is based on a location of the mobile device.

89. The system of claim 83, wherein the aggregated guide and frequency data is based on user subscription information.

90. The system of claim 83, wherein the guide data for the first network and the guide data for the second network is at least one of translated or merged to form the aggregated guide data.

91. The system of claim 83, wherein the means for processing further comprises means for receiving a pointer to the aggregated guide and frequency data via a broadcast network.

92. The system of claim 91, wherein the means for processing further comprises means for receiving the aggregated guide and frequency data via a unicast network.

93. The system of claim 83, wherein the aggregated guide and frequency data originates at a content server.

94. The system of claim 83, wherein the means for processing further comprises means for receiving the aggregated guide and frequency data separately from the content.

95. A computer program product, comprising:
    a computer-readable medium comprising:
        at least one instruction for causing a computer to provide a program guide displaying a listing of content scheduled for broadcast; and
        at least one instruction for causing a computer to receive aggregated guide and frequency data associated with the program guide, wherein the aggregated guide and frequency data includes guide and frequency data received from a first network and guide and frequency data received from a second network, wherein the aggregated guide and frequency data identifies a first frequency at which the first network operates and a second frequency at which the second network operates.

96. The computer program product of claim 95, wherein the computer-readable medium further comprises at least one instruction for causing a computer to enter into a service connection with at least one of the first network and the second network.

97. The computer program product of claim 95, wherein the aggregated guide and frequency data is received from at least one of the first network and the second network.

98. The computer program product of claim 95, wherein the aggregated guide and frequency data is based on user subscription information.

99. The computer program product of claim 95, wherein the first network and the second network mutually authenticate the aggregated guide and frequency data.

100. The computer program product of claim 72, wherein the guide data for the first network and the guide data for the second network is at least one of translated or merged to form the aggregated guide data.

101. The computer program product of claim 95, wherein the computer-readable medium further comprises at least one instruction for causing a computer to receive a pointer to the aggregated guide and frequency data via a broadcast network.

102. The computer program product of claim 101, wherein the computer-readable medium further comprises at least one instruction for causing a computer to retrieve the aggregated guide and frequency data via a unicast network.

103. The computer program product of claim 95, wherein the aggregated guide and frequency data is received from an upper network in hierarchical coverage with the first network and the second network.

104. The computer program product of claim 95, wherein the aggregated guide and frequency data originates at a content server.

105. The computer program product of claim 95, wherein the aggregated guide and frequency data is based on a location of the computer.

106. The computer program product of claim 95, wherein the computer-readable medium further comprises at least one instruction for causing the computer to receive the aggregated guide and frequency data separately from the content.

107. A method for guide and frequency map support across multiple networks, the method comprising:
- receiving, at an upper network, at least one of guide and frequency data for a first network, wherein the guide and frequency data for the first network identifies available content and associated channels provided by the first network;
- receiving, at the upper network, at least one of guide and frequency data for a second network, wherein the guide and frequency data for the second network identifies available content and associated channels provided by the second network; and
- generating aggregated guide and frequency data from the at least one of guide and frequency data for the first network and the at least one of guide and frequency data for the second network,
- wherein the upper network is in hierarchical coverage with the first network and the second network.

108. The method of claim 107, further comprising:
- receiving first service area data and first physical layer configuration data corresponding to the first network, wherein the first network broadcasts a first content to a first plurality of devices within a first service area, and wherein a physical layer of the first network is configured in accordance with the first physical layer configuration data; and
- receiving second service area data and second physical layer configuration data corresponding to the second network, wherein the second network transmits a second content to a second plurality of devices within a second service area, and wherein a second physical layer of the second network is configured in accordance with the second physical layer configuration data.

109. The method of claim 108, wherein the first service area data, the first physical layer configuration data, the second service area data, and the second physical layer configuration data are included in the aggregated guide and frequency data.

110. The method of claim 108, wherein a third service area of the upper network includes the first service area of the first network and the second service area of the second network, wherein the first service area of the first network is exclusive of the second service area of the second network.

111. An upper network server, comprising:
- a wireless interface;
- a memory; and
- a processor coupled to the wireless interface and the memory, wherein the processor is configured with processor-executable instructions to perform operations comprising:
  - receiving at least one of guide and frequency data for a first network, wherein the guide and frequency data for the first network identifies available content and associated channels provided by the first network;
  - receiving at least one of guide and frequency data for a second network, wherein the guide and frequency data for the second network identifies available content and associated channels provided by the second network; and
  - generating aggregated guide and frequency data from the at least one of guide and frequency data for the first network and the at least one of guide and frequency data for the second network,
  - wherein the upper network server is in hierarchical coverage with the first network and the second network.

112. The upper network server of claim 111, wherein the processor is configured with processor-executable instructions to perform operations further comprising:
- receiving first service area data and first physical layer configuration data corresponding to the first network, wherein the first network broadcasts a first content to a first plurality of devices within a first service area, and wherein a physical layer of the first network is configured in accordance with the first physical layer configuration data; and
- receiving second service area data and second physical layer configuration data corresponding to the second network, wherein the second network transmits a second content to a second plurality of devices within a second service area, and wherein a second physical layer of the second network is configured in accordance with the second physical layer configuration data.

113. The upper network server of claim 112, wherein the processor is configured with processor-executable instructions to further perform operations such that:
- the first service area data, the first physical layer configuration data, the second service area data, and the second physical layer configuration data are included in the aggregated guide and frequency data.

114. The upper network server of claim 112, wherein the processor is configured with processor-executable instructions to further perform operations such that:
- a third service area of the upper network server includes the first service area of the first network and the second service area of the second network, wherein the first service area of the first network is exclusive of the second service area of the second network.

115. An upper network server, comprising:
- means for receiving at least one of guide and frequency data for a first network, wherein the guide and frequency data for the first network identifies available content and associated channels provided by the first network;
- means for receiving at least one of guide and frequency data for a second network, wherein the guide and frequency data for the second network identifies available content and associated channels provided by the second network; and
- means for generating aggregated guide and frequency data from the at least one of guide and frequency data for the first network and the at least one of guide and frequency data for the second network,
- wherein the upper network server is in hierarchical coverage with the first network and the second network.

116. The upper network server of claim 115, further comprising:
- means for receiving first service area data and first physical layer configuration data corresponding to the first network, wherein the first network broadcasts a first content to a first plurality of devices within a first service area, and wherein a physical layer of the first network is configured in accordance with the first physical layer configuration data; and
- means for receiving second service area data and second physical layer configuration data corresponding to the second network, wherein the second network transmits a second content to a second plurality of devices within a second service area, and wherein a second physical layer of the second network is configured in accordance with the second physical layer configuration data.

117. The upper network server of claim 116, wherein the first service area data, the first physical layer configuration data, the second service area data, and the second physical layer configuration data are included in the aggregated guide and frequency data.

118. The upper network server of claim 116, wherein a third service area of the upper network server includes the first service area of the first network and the second service area of the second network, wherein the first service area of the first network is exclusive of the second service area of the second network.

119. A non-transitory computer-readable storage medium having stored thereon processor-executable instructions configured to cause a processor of an upper network server to perform operations comprising:
  receiving at least one of guide and frequency data for a first network, wherein the guide and frequency data for the first network identifies available content and associated channels provided by the first network;
  receiving at least one of guide and frequency data for a second network, wherein the guide and frequency data for the second network identifies available content and associated channels provided by the second network; and
  generating aggregated guide and frequency data from the at least one of guide and frequency data for the first network and the at least one of guide and frequency data for the second network,
  wherein the upper network server is in hierarchical coverage with the first network and the second network.

120. The non-transitory computer-readable storage medium of claim 119, wherein the stored processor-executable instructions are configured to cause the processor of the upper network server to perform operations further comprising:
  receiving first service area data and first physical layer configuration data corresponding to the first network, wherein the first network broadcasts a first content to a first plurality of devices within a first service area, and wherein a physical layer of the first network is configured in accordance with the first physical layer configuration data; and
  receiving second service area data and second physical layer configuration data corresponding to the second network, wherein the second network transmits a second content to a second plurality of devices within a second service area, and wherein a second physical layer of the second network is configured in accordance with the second physical layer configuration data.

121. The non-transitory computer-readable storage medium of claim 120, wherein the stored processor-executable instructions are configured to cause the processor of the upper network server to further perform operations such that:
  the first service area data, the first physical layer configuration data, the second service area data, and the second physical layer configuration data are included in the aggregated guide and frequency data.

122. The non-transitory computer-readable storage medium of claim 120, wherein the stored processor-executable instructions are configured to cause the processor of the upper network server to further perform operations such that:
  a third service area of the upper network server includes the first service area of the first network and the second service area of the second network, wherein the first service area of the first network is exclusive of the second service area of the second network.

* * * * *